(12) United States Patent
Ducharme

(10) Patent No.: US 7,017,998 B2
(45) Date of Patent: Mar. 28, 2006

(54) ADAPTABLE TRANSPORT

(76) Inventor: Robert O. Ducharme, 4523 Colony West Dr., Richmond, TX (US) 77469

( * ) Notice: Subject to any disclaimer, the term of this patent is extended or adjusted under 35 U.S.C. 154(b) by 0 days.

(21) Appl. No.: 10/281,368

(22) Filed: Oct. 25, 2002

(65) Prior Publication Data

US 2004/0080205 A1    Apr. 29, 2004

(51) Int. Cl.
*B62D 3/08* (2006.01)
*A01D 43/06* (2006.01)

(52) U.S. Cl. ............... 298/2; 298/1 C; 298/17.6; 56/204

(58) Field of Classification Search ............... 298/1 A, 298/1 B, 1 C, 2, 10, 17 R, 17.5–17.8; 56/202, 56/203, 204
See application file for complete search history.

(56) References Cited

U.S. PATENT DOCUMENTS

| | | | | |
|---|---|---|---|---|
| 954,560 | A * | 4/1910 | Astrom ................... 105/265 |
| 1,158,291 | A * | 10/1915 | Rickards ................. 280/47.31 |
| 2,770,088 | A * | 11/1956 | McNamara ................ 56/200 |
| 2,918,133 | A | 12/1959 | Ericsson |
| 3,065,588 | A * | 11/1962 | Shaw ..................... 56/13.4 |
| 3,134,214 | A * | 5/1964 | Shaw ..................... 56/202 |
| 3,281,186 | A * | 10/1966 | Davis ..................... 298/2 |
| 3,706,189 | A * | 12/1972 | Rutherford ............... 56/13.4 |
| 3,827,369 | A * | 8/1974 | Mueller .................. 104/118 |
| 3,987,606 | A * | 10/1976 | Evans .................... 56/13.4 |
| 4,068,455 | A * | 1/1978 | Zehrung et al. .......... 56/344 |
| 4,090,457 | A | 5/1978 | Roberts |
| 4,158,280 | A * | 6/1979 | Thomas et al. ........... 56/202 |
| 4,372,064 | A * | 2/1983 | Benenate et al. ......... 37/403 |
| 4,377,063 | A * | 3/1983 | Leaphart ................. 56/202 |
| RE32,067 | E * | 1/1986 | Emory .................... 56/16.8 |
| 4,589,508 | A | 5/1986 | Hoover et al. |
| 4,802,709 | A * | 2/1989 | Jones ..................... 298/10 |
| 4,807,716 | A | 2/1989 | Hawkins |
| 4,811,988 | A | 3/1989 | Immel |
| 4,861,110 | A | 8/1989 | Rumpke |
| 5,010,716 | A * | 4/1991 | Fassauer ................. 56/12.1 |
| 5,033,258 | A * | 7/1991 | Morse ..................... 56/2 |
| 5,090,142 | A | 2/1992 | Peters |
| 5,195,308 | A * | 3/1993 | Grote et al. ............. 56/16.4 R |
| 5,211,254 | A | 5/1993 | Harris, III et al. |
| 5,284,218 | A | 2/1994 | Rusher, Jr. |
| 5,285,936 | A | 2/1994 | Matricardi, Jr |
| 5,305,843 | A | 4/1994 | Armstrong |
| 5,350,030 | A | 9/1994 | Mawhinney et al. |
| 5,385,306 | A * | 1/1995 | Cervenka ................. 239/663 |
| 5,465,801 | A | 11/1995 | Hoover |
| 5,485,963 | A * | 1/1996 | Walto et al. ............. 239/663 |
| 5,489,000 | A | 2/1996 | Hillbohm |
| 5,878,827 | A | 3/1999 | Fox |
| 5,884,924 | A * | 3/1999 | Fairchild et al. ........ 280/47.31 |
| 5,897,283 | A | 4/1999 | Lenguyen |
| 5,915,706 | A | 6/1999 | Mosley |
| 5,992,134 | A * | 11/1999 | Blide et al. ............. 56/16.8 |
| 6,715,980 | B1 * | 4/2004 | Bouthillier .............. 414/642 |
| 6,904,742 | B1 * | 6/2005 | Dunning et al. .......... 56/202 |
| 2005/0016148 | A1 * | 1/2005 | Caroni ................... 56/204 |

* cited by examiner

*Primary Examiner*—H. Gutman
(74) *Attorney, Agent, or Firm*—David B. Dickinson; Lundeen & Dickinson, LLP

(57) ABSTRACT

The present invention relates to a motorized transport for transportation and delivery of a load of material. A preferred embodiment of the present invention provides an adaptable transport comprised of a hopper having an upper support and a lower support. The supports provide removable interaction with the motorized cart.

5 Claims, 7 Drawing Sheets

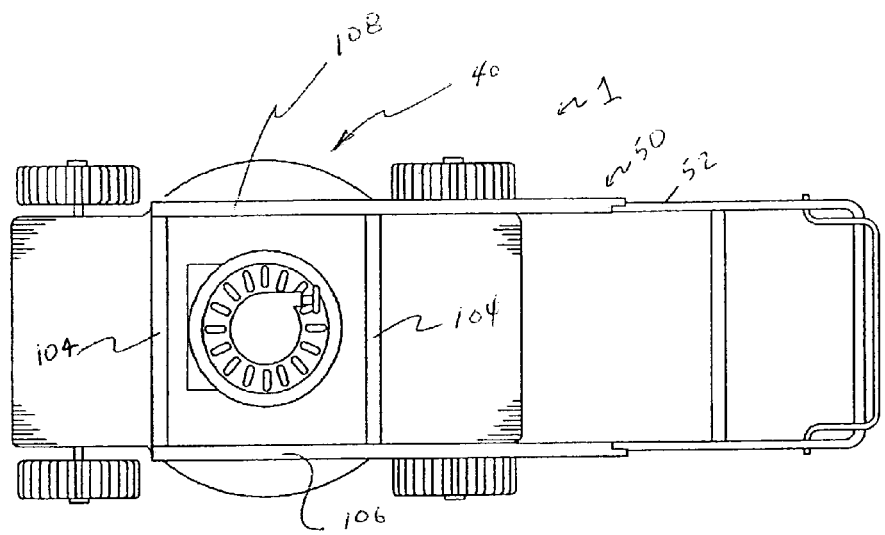
FIG. 13
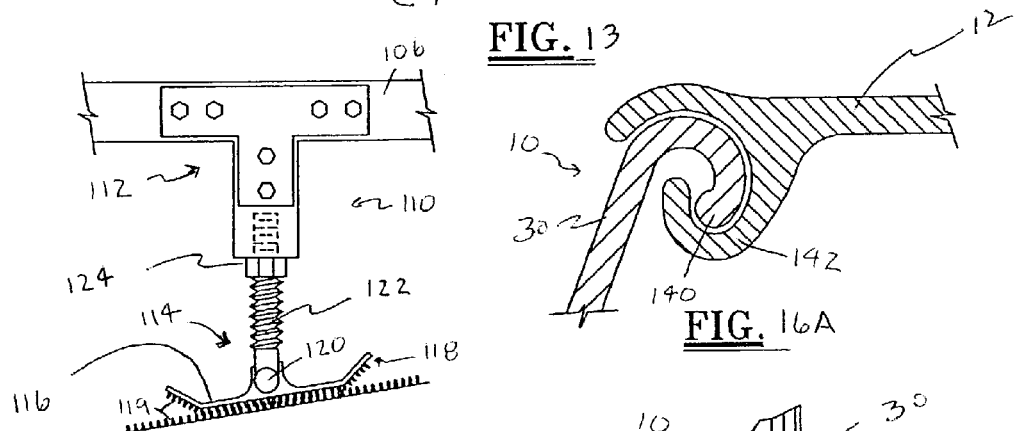
FIG. 14
FIG. 16A
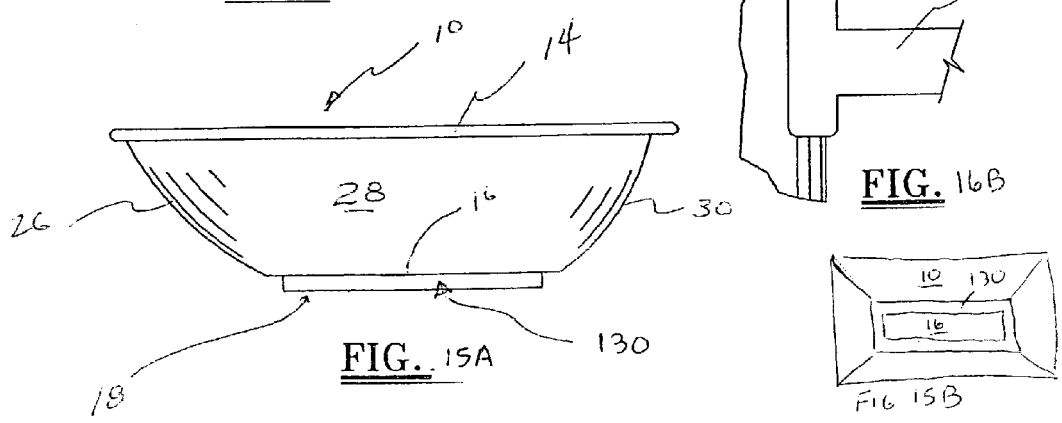
FIG. 15A
FIG. 16B
FIG. 15B

ADAPTABLE TRANSPORT

FIELD OF THE INVENTION

The present invention relates to an adaptable transport for transportation and delivery of a load of material. More specifically, the present invention relates to an adaptable transport for attachment to a motorized apparatus, such as a lawnmower, to facilitate transportation and delivery of heavy or bulky loads that are being maneuvered across lawns, up hills or slopes, or across difficult terrain.

BACKGROUND OF THE INVENTION

Wheelbarrows have long been used in construction, gardening, and other home applications where loads are moved and transported from one place to another. The unique single wheel design of the traditional wheelbarrow enables a relatively heavy load to be balanced and maneuvered, with particular advantage in tight quarters. The wheelbarrow in both single wheel and double wheel designs enables a single person to transport quite heavy loads. They are very maneuverable and are cheap to manufacture. However, they do have some shortcomings. They require the operator to have strong upper body strength, plus full use of all limbs and are extremely difficult to push up slopes or over any appreciable distance on level ground.

Many attempts have been made to alleviate the aforementioned problem by motorizing the wheelbarrow. Examples include U.S. Pat. No. 5,878,827 to Fox, U.S. Pat. No. 5,489,000 to Hillbohm, U.S. Pat. No. 5,465,801 to Hoover, U.S. Pat. No. 5,305,843 to Armstrong, U.S. Pat. No. 5,211,254 to Harris, III et al, and U.S. Pat. No. 4,589,508 to Hoover et al. All of the above mentioned patents disclose gasoline powered or battery powered motors affixed to a traditional wheelbarrow to supply the drive force. While more efficient than traditional manpowered wheelbarrows, the motorized wheelbarrows still require significant manpower to maintain the balance of the overall structure while maneuvering. Thus, the motorized wheelbarrows still encounter great difficulty when used to transport heavy or unbalanced loads, or when transporting loads over particularly difficult terrain.

An additional disadvantage of the aforementioned motorized wheelbarrows is that the motor is generally located to the rear of the wheel resulting in a burden on the user to lift the motor while moving the wheelbarrow from place to place. Further, when the wheelbarrow is tipped to deliver the load, the weight of the motor remains a cantilevered burden which must be raised up to a position in which it becomes top-heavy when the load slides out of the hopper. Still further, because the motor is located below the bottom of the wheelbarrow hopper, to prevent damage to the motor the wheelbarrow must be further lifted when obstructed by stones, bricks, or other debris.

Examples of devices intended to overcome the above mentioned problems with motorized wheelbarrows are found in U.S. Pat. No. 5,284,218 to Rusher, Jr., U.S. Pat. No. 4,811,988 to Immel, and U.S. Pat. No. 4,807,716 to Hawkins. All three patents disclose four-wheel motorized carts. The motorized carts provide the same ability to maneuver heavy loads as the motorized wheelbarrows, but have added stability provided by the existence of four wheels. Further, the Rusher, Jr. patent discloses means for delivering the load without having to lift the entire motor.

While the motorized carts are advantageous over the motorized wheelbarrows, both devices share the same disadvantage of being relatively expensive to manufacture and thus needlessly expensive to the user if not needed for everyday use. The expense forecloses the infrequent user from purchasing such a product.

There exists a need, therefore, for a device that is inexpensive to manufacture and suitable for infrequent use that provides motorized transport of materials.

One way of minimizing the costs involved in a particular apparatus which may be used infrequently is to provide a multi-purpose device such as that in U.S. Pat. No. 4,090,457 to Roberts. Although not motorized, the Roberts device combines a hand operated plow which can be converted to a seed planter and fertilizer or to a wheelbarrow. The concept is also utilized in U.S. Pat. No. 5,090,142 to Peters which utilizes an attachment to convert a standard lawnmower into a snowblower when the occasion arises. Similar to a wheelbarrow, the snowblower is subject to infrequent use and it is not cost efficient to purchase the entire apparatus for once a year use.

There exists a need, therefore, for a device which provides motorized transport of materials when combined with another standard piece of equipment.

BRIEF DESCRIPTION OF THE DRAWINGS

FIG. 13 illustrates a top view of an embodiment of the adaptable transport having a lower support frame. The top view is shown with the hopper removed.

FIG. 14 illustrates a side view of an embodiment of a pivot foot used as a lower support.

FIGS. 15A and 15B illustrate a side and bottom view of an embodiment of a hopper with a sub-frame.

FIGS. 16A and 16B illustrate a side and top view of an embodiment of a removable handle.

DETAILED DESCRIPTION OF THE PREFERRED EMBODIMENT

In the following detailed description of the preferred embodiments of the adaptable transport, the invention is described as being removably affixed to a standard gasoline powered lawnmower. This combination is particularly advantageous due to the commonplace ownership of standard gasoline powered lawnmowers. The present invention is not, however, restricted to being combined with a lawnmower. Those skilled in the art will recognize that the present invention may be used to advantage for connection with any number of motorized carts. However, for purposes of illustration and not for limitation, the present invention will be described with reference to combination with a standard gasoline powered lawnmower.

It should also be noted that because the hopper of the present invention is utilized to transport loads of material, there are numerous shapes and sizes of containers that can be used with the adaptable transport. Additionally, the hoppers can be made of various materials depending upon the application and depending upon the size of the motor driving the lawnmower (or cart if attached thereto). For example, during everyday yard use, it might be preferable to use a hopper manufactured from a lightweight suitable plastic or polymeric substrate to facilitate easy movement and lifting. Conversely, for rugged hauling it might be more advantageous for the hopper to be manufactured from metals such as aluminum or steel. All variations of hoppers are intended to fall within the purview of the invention.

Figure 1:
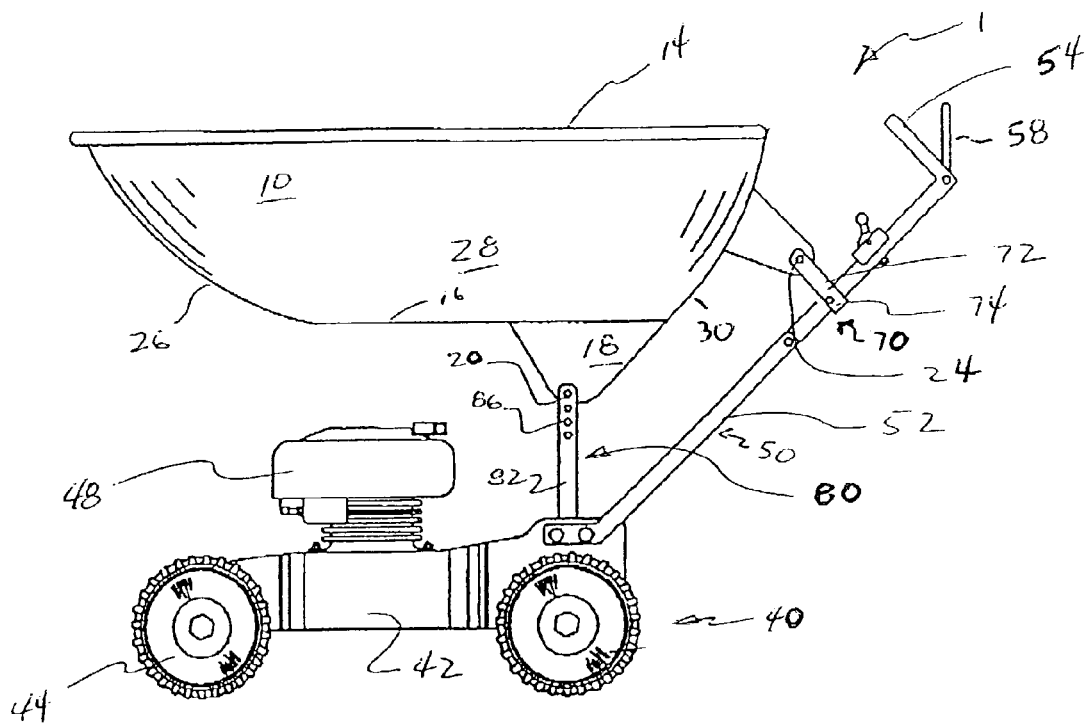
FIG. 1 is a side view of an embodiment of the adaptable transport affixed to the rear chassis of a lawnmower.
Figure 2:
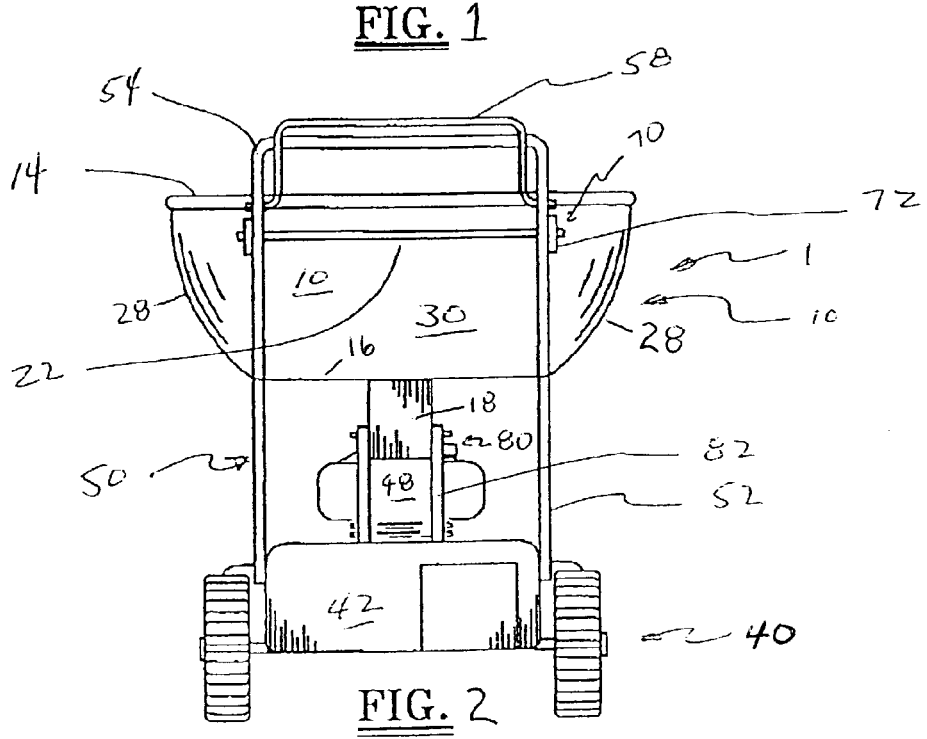
FIG. 2 is a rear view of an embodiment of the adaptable transport affixed to the rear chassis of a lawnmower.

FIGS. 1 and 2 are side and rear views, respectively, of an embodiment of the adaptable transport (indicated generally as 1) of the present invention affixed to the rear of a lawnmower (indicated generally as 40). The adaptable transport 1 is comprised of a hopper 10 affixed to a lawnmower 40 by upper brackets 70 and lower brackets 80.

In this embodiment, the hopper 10 is essentially an open-faced container having a base 16, two side walls 28, a front wall 26, and a rear wall 30. The upper receiving end 14 is open for receipt of materials to be transported. A lid can optionally be provided to secure the load from escaping while it is being hauled. Affixed to the outside surface of the base 16 is the lower support 18. The lower support 18 is a solid element extending across a portion of the base 16. Attachment receptacles 20 are located on the lower support 18. Affixed to the outside surface of the rear wall 30 of the hopper 10 is an upper support 22. The upper support 22 is a solid element extending across a portion of the rear wall 30. Located thereon the upper support 22 are securing receptacles 24.

The cart, in this case the lawnmower 40, to which the hopper 10 is to be affixed is a standard gasoline powered lawnmower 40 comprised of a chassis 42, an engine 48, and a control frame 50. The chassis 42 has affixed thereto a pair of front wheels 44 and a pair of rear wheels 46. The control frame 50 has two side bars 52, a handle 54, and a clutch 58. It should be noted that the lawnmower 40 is described in generic terms and any additions or subtractions of lawnmower 40 parts still fall within the purview of the invention. The novel features of the present invention are not drawn to the lawnmower 40, but rather the combination of a standard lawnmower 40 and the adaptable transport 1.

To secure the hopper 10 to the lawnmower 40, a lower bracket 80 and an upper bracket 70 are utilized. In the shown embodiment, the lower bracket 80 is comprised of a pair of support braces 82 which are affixed either permanently or temporarily to the rear surface of the chassis 42 of the lawnmower 40. The support braces 82 can be affixed to the chassis 42 with conventional means such as screws or securing pins. The support braces 82 have a plurality of attachment receptacles 86 which are used in association with the attachment receptacles 20 of the lower support 18 to rotatably affix the hopper 10 to the lawnmower 40 such that the hopper 10 can be tilted forward for dumping or receiving the desired load. The plurality of attachment receptacles 86 enables the height at which the hopper 10 is mounted above the lawnmower 40 to be adjusted to account for differing engine 48 heights.

It should be noted that regardless of whether the pair of support braces 82 are affixed permanently or temporarily to the surface of the chassis 42, the hopper 10 is removable from the support braces 82. The ability of the hopper 10 to be unattached from the lawnmower 40 is particularly advantageous because it enables the hopper 10 to be stowed until needed and enables continued use of the lawnmower 40 with or without the hopper 10 attached.

The upper bracket 70 is comprised of a pair of side braces 72. The side braces 72 are affixed to the side bars 52 of the control frame 50 of the lawnmower 40. The side braces 72 are affixed to the side bars 52 with conventional means such as screws, securing pins, or mounting brackets. Each of the side braces 72 have a plurality of securing receptacles 74 which are used in association with the securing receptacles 24 of the upper support 22 of the hopper 10 to removably secure the upper support 22 to the upper bracket 70. The removable engagement enables the hopper 10 to be tilted forward for dumping or receiving the desired load. The plurality of securing receptacles 74 accounts for the differing positions at which lower support 18 of the hopper 10 can be attached to the lower bracket 80.

Figure 3:
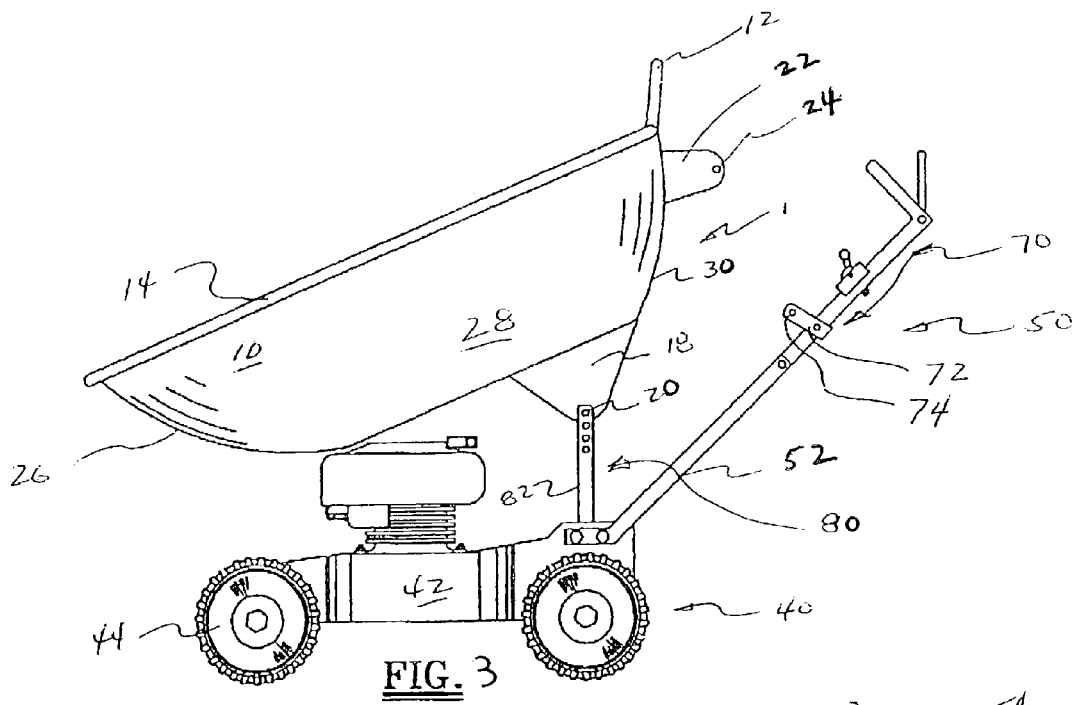
FIG. 3 is a side view of an embodiment of the adaptable transport affixed to the rear of a lawnmower with the hopper tilted.

FIG. 3 is a side view of an embodiment of the adaptable transport 1 affixed to the rear of a lawnmower 40 with the hopper 1 in a tilted position. As illustrated, the upper support 22 of the bracket has been released from engagement by the upper bracket 70 so as to enable the hopper 10 to rotate about the lower bracket 80 to facilitate dumping or receiving a load. It should be noted that depending upon the size of the engine 48 of the lawnmower 40, the hopper 10 may be prevented from the amount of rotation necessary to remove the load. The problem can be overcome by utilizing longer support braces 82 or simply lifting the entire assembly of the lawnmower 40 and hopper 10 such that the assembly pivots about the front wheels 44. Lifting the entire assembly is facilitated by first tilting the hopper 10 to shift the weight of the load forward.

As shown in FIG. 3, to facilitate lifting of the hopper, a handle 12 or a plurality of handles 12 has been attached to the rear end 30 of the hopper 10. The handles 12 can be permanently or temporarily affixed for lifting.

Figure 4:
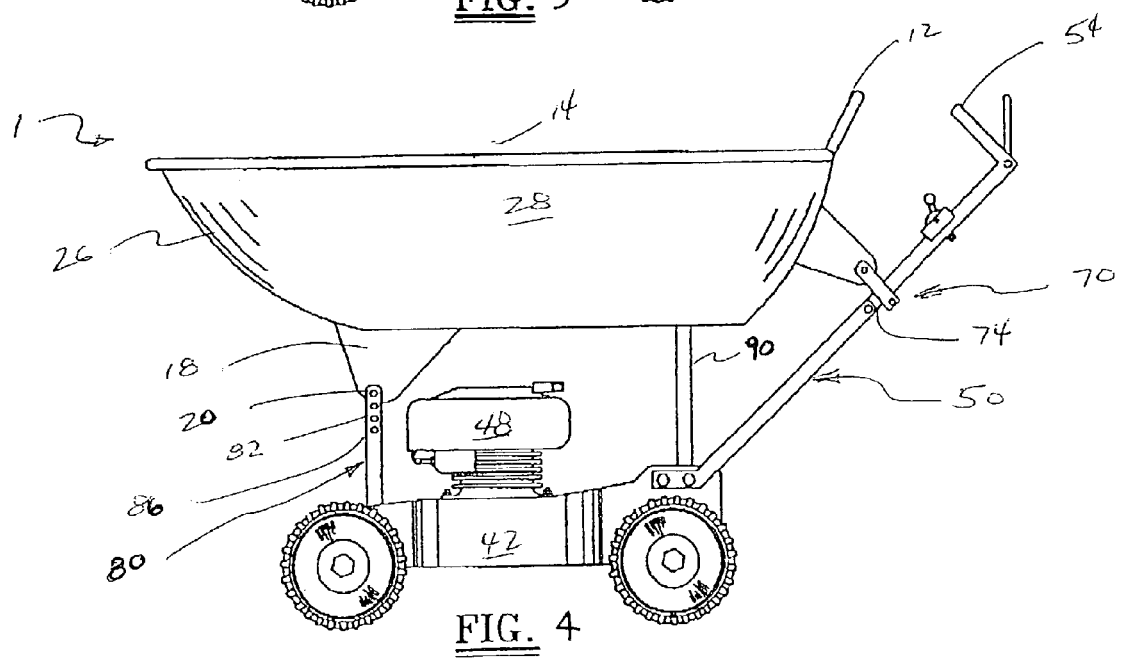
FIG. 4 is a side view of an embodiment of the adaptable transport affixed to the front chassis of a lawnmower.
Figure 5:
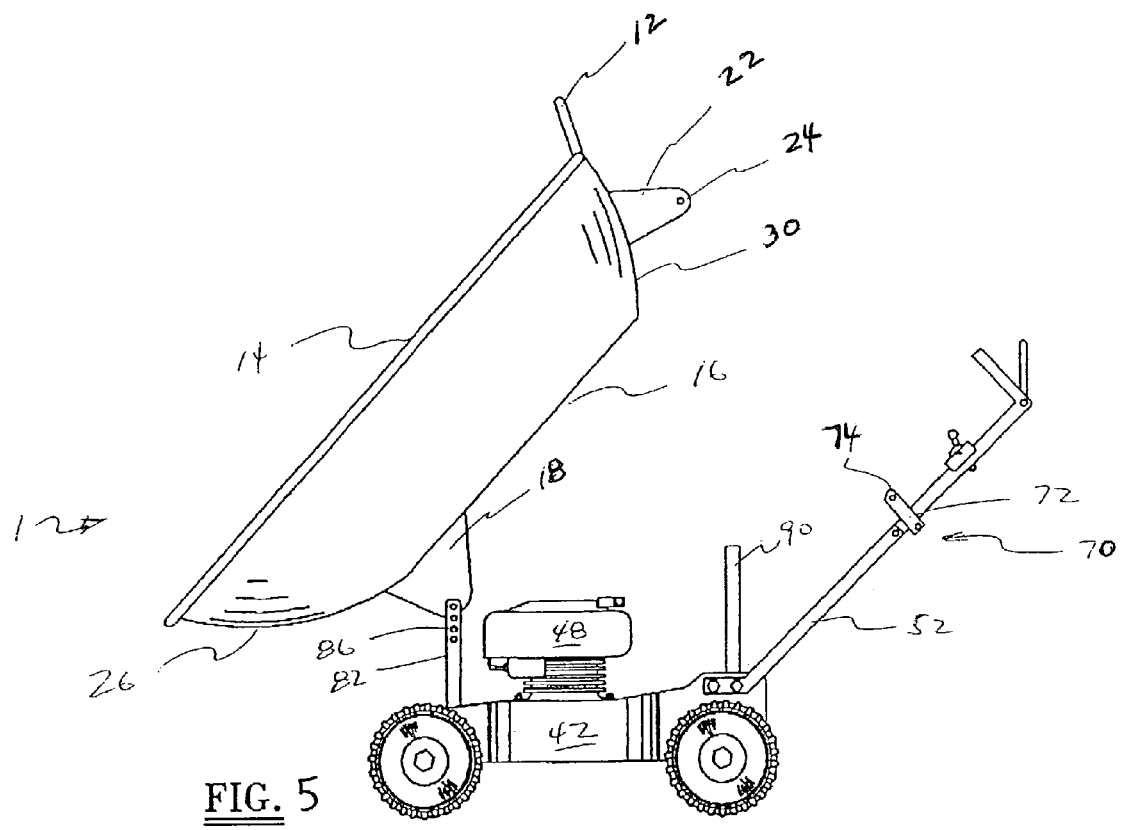
FIG. 5 is a side view of an embodiment of the adaptable transport affixed to the front chassis of a lawnmower with the hopper in a tilted position.

FIGS. 4 and 5 illustrate side views of an embodiment of the adaptable transport 1 of the present invention affixed to the front of the chassis 42 of the lawnmower 40. In FIG. 4 the hopper 10 is in its resting position and in FIG. 5 the hopper 10 is tilted. In this embodiment, the support braces 82 of the lower bracket 80 are affixed to the front of the chassis 42. This embodiment is particularly advantageous in overcoming the obstruction of the engine 48 of the lawnmower 40. As shown in FIG. 5, the hopper 10 is free to rotate without obstruction to facilitate easier dumping and receiving of materials.

As shown in FIGS. 4 and 5, a rear stabilizer 90 is provided to protect the engine 48 and to provide a more stable assembly. The rear stabilizer 90 is affixed to the rear of the chassis 42. The rear stabilizer can be affixed by any conventional means such as screws or securing pins. The rear stabilizer provides a rest for the hopper 10 when not tilted. Although particularly advantageous when dealing with heavy loads, one skilled in the art will recognize that the adaptable transport 1 can be provided without the rear stabilizer 90 and remain within the purview of the invention.

Figure 6:
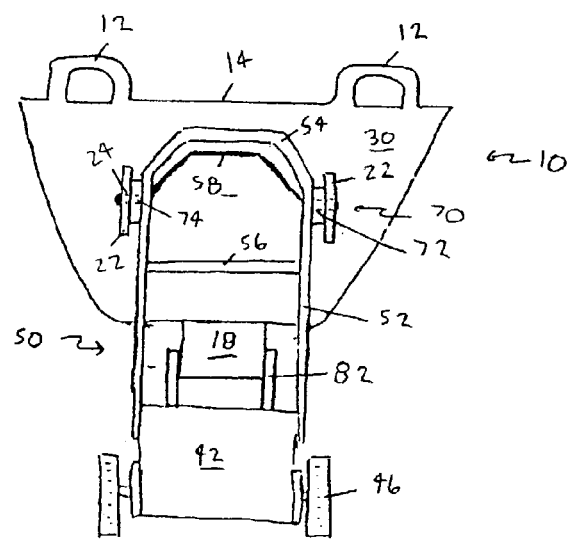
FIG. 6 is a rear view of an embodiment of the adaptable transport affixed to the rear chassis of a lawnmower showing an alternate securing embodiment.

FIG. 6 shows a rear view of another embodiment of the adaptable transport 1 affixed to the rear chassis 42 of the lawnmower 40 having an alternate upper securing device. In this embodiment, there are a pair of upper supports 22 that project from the back wall 30 of the hopper. The upper supports 22 are secured to the side braces 72 of the upper bracket by removably attaching the securing receptacles 24 of the upper supports 22 to the securing receptacles 74 of the upper bracket 70.

Figure 7:
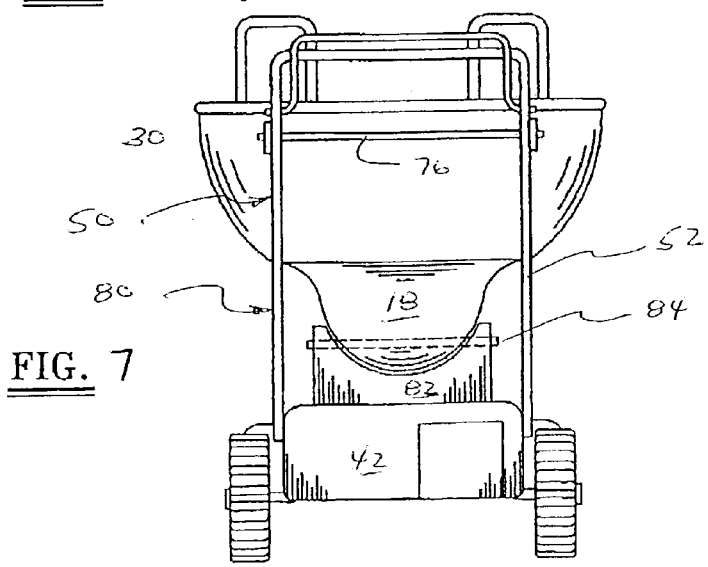
FIG. 7 is a rear view of an embodiment of the adaptable transport affixed to the rear chassis of a lawnmower showing an alternate securing embodiment.

An alternate embodiment of the lower bracket 80 is illustrated in FIG. 7. In this alternate lower support embodiment, the lower bracket 80 is comprised of a solid support brace 82 for receipt of a securing rod 84 therethrough. The securing rod 84 is secured through the support brace 82 and through the securing receptacles 20 of the lower support 18. Use of the securing rod 84 enables rotatable engagement and offers the advantage of quick release of the connection between the hopper 10 and the lawnmower 40.

Figure 8:
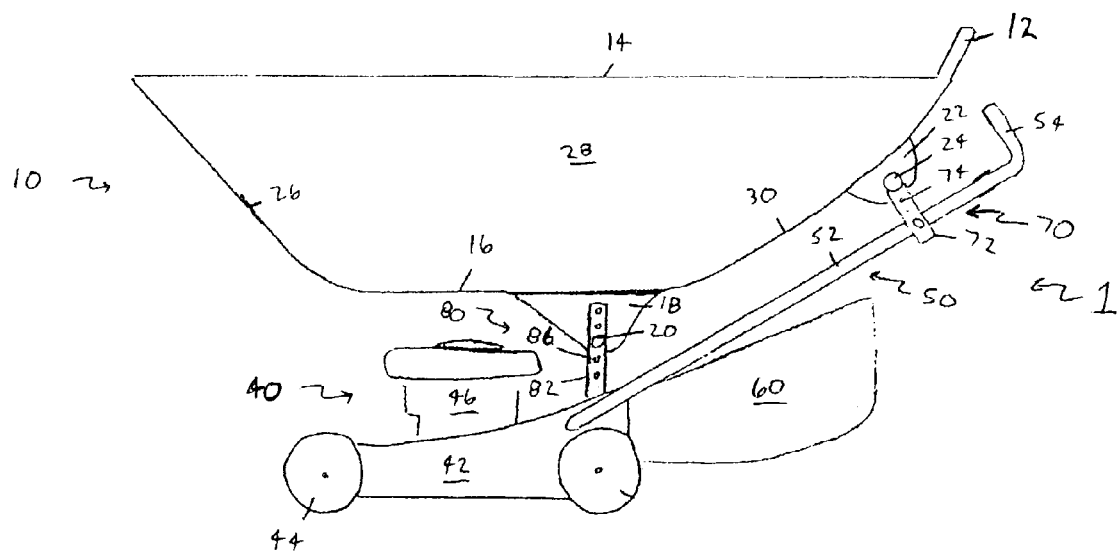
FIG. 8 is a side view of an embodiment of the adaptable transport affixed to the rear chassis of a lawnmower with the rear bag of the lawnmower attached.

Another embodiment of the adaptable transport is illustrated in FIG. 8. In this embodiment, the adaptable transport 1 is affixed to the rear of the chassis 42 of the lawnmower 40 with the rear bag 60 of the lawnmower 40 attached. As discussed above, the lawnmower 40 can still be used with or without the hopper 10 attached. In the embodiment depicted in FIG. 8, the hopper 10 is used simultaneously with the rear bag 60 of the lawnmower 40. This embodiment is particularly advantageous when operating the lawnmower 40 upon a large tract of land resulting in a large amount of clippings and leaves. Rather than having to continuously trek across the land to empty the rear bag 60, the rear bag 60 can be emptied into the hopper 10 and dumped along with the rest of the hopper 10 contents at a convenient location. It should be noted that although the bag 60 depicted in FIG. 8 is a rear bag, one skilled in the art will recognize that side bags can be utilized with equal efficiency.

Figure 9:
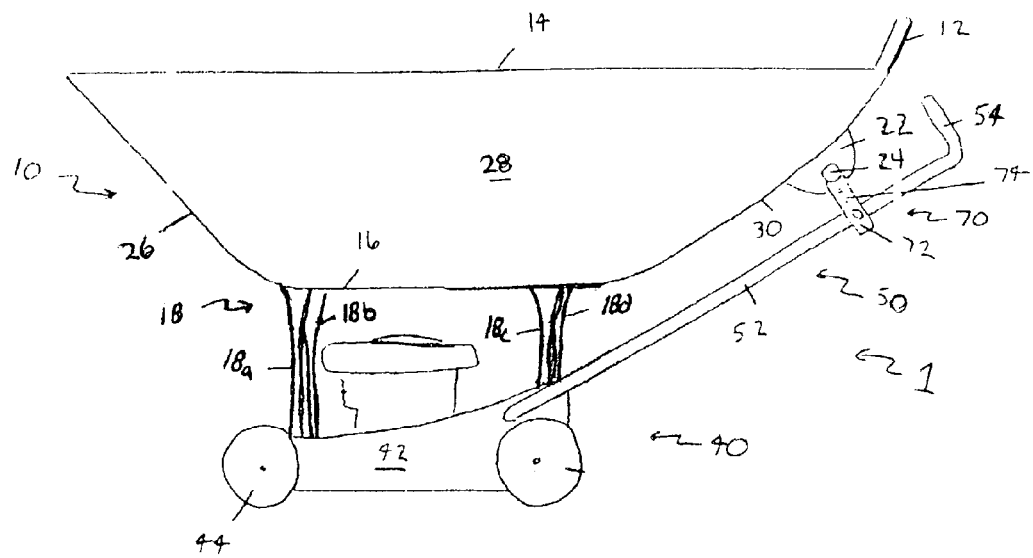
FIG. 9 illustrates a side view of another embodiment of the adaptable transport having an alternate lower support.

FIG. 9 illustrates a side view of another embodiment of the adaptable transport 1. In this embodiment, the lower support 18 of the hopper 10 is comprised of support legs 18*a*, 18*b*, 18*c*, and 18*d*. In this embodiment, the lower bracket 80 (shown in previous figures) is not necessary. The support legs 18*a*, 18*b*, 18*c*, and 18*d* rest atop the chassis 42 of the lawnmower 40 and in conjunction with the upper support 22 and the upper bracket 70 provide support and stability for the hopper 10. The front set of support legs 18*a*, 18*b* can be rotatably affixed to the front of the chassis 42 to enable tilting of the hopper 10 to release the load. Such fixation can be accomplished by means such as pins, screws, or bolts.

Figure 10:
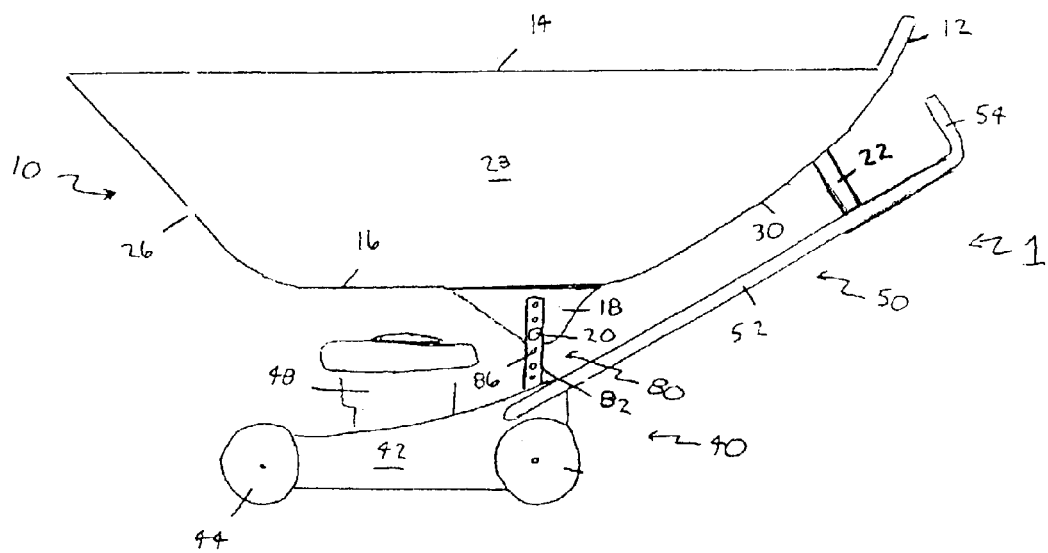
FIG. 10 illustrates a side view of another embodiment of the adaptable transport having an alternate upper support.

Another embodiment of the adaptable transport 1 is illustrated in FIG. 10. In this embodiment, the upper support 22 of the hopper 10 is sized and shaped for resting upon the side bars 52 of the frame 50 of the lawnmower 40. In this embodiment the upper bracket 70 is not necessary. Support and stability of the hopper 10 is provided by the combination of the lower support 18 and the upper support 22.

Figure 11:
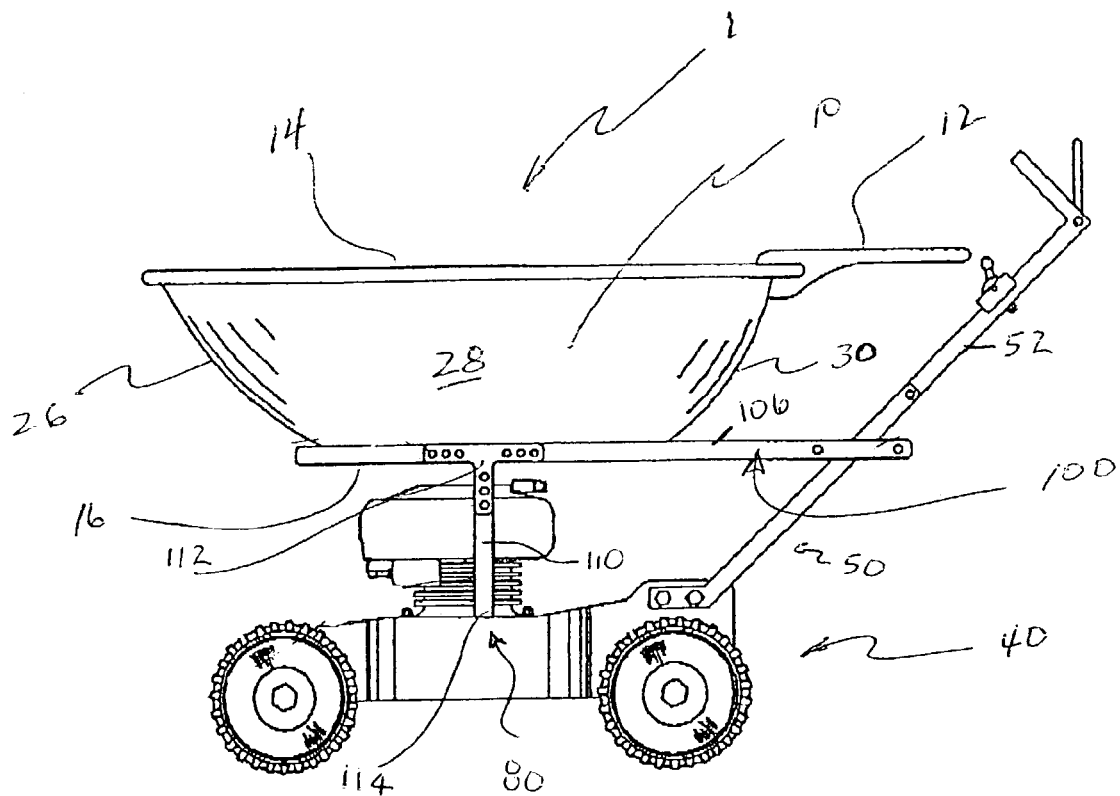
FIG. 11 illustrates a side view of an embodiment of the adaptable transport having a lower support frame.
Figure 12:
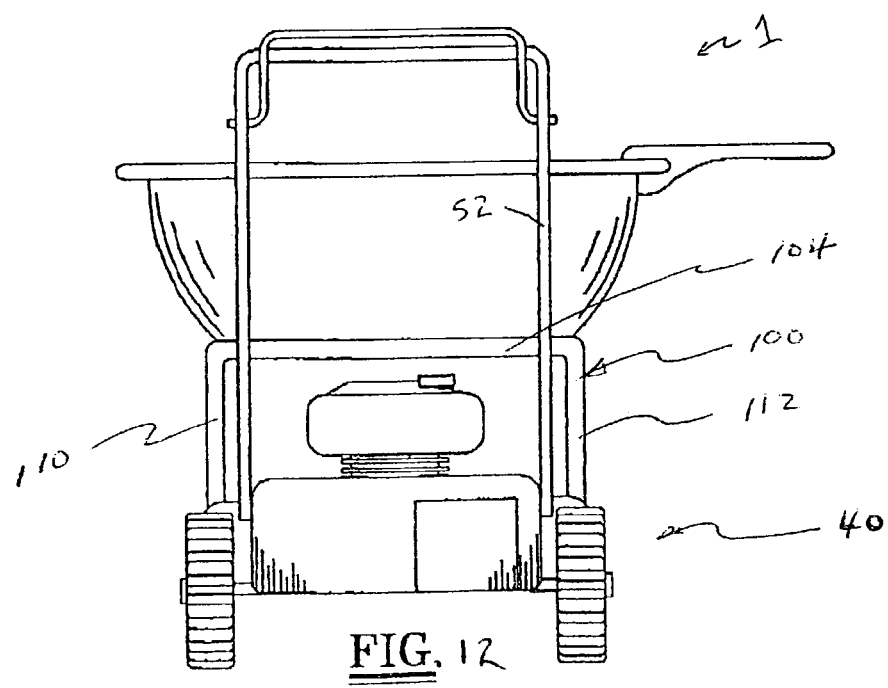
FIG. 12 illustrates a rear view of an embodiment of the adaptable transport having a lower support frame.

FIGS. 11–13 illustrate a side, rear, and top view, respectively, of another embodiment of the adaptable transport 1. In this embodiment, the lower bracket 80 comprises a support frame 100. The support frame 100 has a pair of horizontal supports 106 that are affixed to the side bars 52 of the control frame 50 of the lawnmower 40. In the embodiment shown, the horizontal supports 106 are affixed to the outside of the side bars 52 to ensure that use of the lawnmower bag 60 is not impeded.

One or more horizontal braces 104 are affixed between the horizontal supports 106 to provide stability and maintain the constant spacing therebetween. As will be discussed below, the horizontal braces 104 in conjunction with the horizontal supports 106 provide a base for carrying the hopper 10.

A pair of vertical supports 110 are used to attach the support frame 100 to the lawnmower 40 and to provide vertical support for the hopper 10 and its load. The proximal end of each vertical support 110 is affixed to the horizontal supports 106 and the distal end is affixed to the chassis 42 of the lawnmower 40. The proximal end of the vertical supports 106 can be affixed to the horizontal supports 106 permanently, such as by welding, or removably, such as by screws. Likewise, the vertical supports 110 can be affixed to the lawnmower 40 permanently, such as by welding, or can be affixed temporarily, such as by screws. In the embodiment illustrated in FIGS. 11–13, the proximal end of each vertical support 110 is affixed to the horizontal supports 106 with a t-shaped tie bracket 112 and the distal end of each vertical support 110 is removeably attached to the chassis 42 of the lawnmower 40 with a pivot foot 114.

The pivot foot 114, best illustrated in FIG. 14, is comprised of a base 116, a swivel joint 120, an attachment screw 122, and a locknut 124. The base 116 is further comprised of an attachment surface 118 for attachment to the chassis 42 of the lawnmower 40. In the shown embodiment, the attachment surface 118 comprises a VELCRO® hook and loop fastener 119 for removable attachment to a mating strip affixed to the chassis 42. Such removable attachment is advantageous if using the support frame 110 on multiple lawnmowers 40 or carts 40 that vary in size and shape. Additionally, such removable attachment enables the support frame 100 to be quickly released from the lawnmower 40 so that the lawnmower 40 can be used for its intended purpose.

The swivel joint 120 is useful to accommodate varying surface slopes of the lawnmower 40 (or cart) to which the support frame 100 is attached. The swivel joint 120 enables fixation to angled surfaces while maintaining the vertical support 106 in a substantially vertical orientation. The attachment screw 122, and locknut 124 are utilized to accommodate various sizes and configurations of lawnmowers 40 or carts. The height of the support frame 100 above the chassis 42 can be altered by rotatably moving the locknut 124 along the attachment screw 122. This assures that proper clearance above the engine 48 can be achieved.

The support frame 100 illustrated in FIGS. 11–13 can be used to advantage for any number of sizes and shapes of hoppers 10 and provides a substantially horizontal frame for carrying the same. One embodiment useful to increase the overall stability of the hopper 10 atop the frame 100, is illustrated in FIGS. 15A and 15B. As shown, a sub-frame 130 is mounted onto the base 16 of the hopper 10. The sub-frame 130 fits within the area of the support frame 100 defined by the horizontal supports 106 and the horizontal braces 104. The horizontal supports 106 and horizontal braces 104 interact with the sub-frame 130 such that the hopper 10 is prevented from excess lateral or sideways movement. In alternate embodiments, the sub-frame 130 can be affixed to the support frame 100 by pins or other means to further increase the stability of the hopper 10 resting atop the lawnmower 40.

Use of the support frame 100 in the adaptable transport 1 enables the hopper 10 to be easily removed as it is not (absent pins or other means) physically attached to the support frame 100. Additionally, the hopper 10 is not restricted to tilting in any one direction. This removes the necessity of having the lawnmower 40 properly oriented to empty the load contained in the hopper 10.

FIGS. 16A and 16B illustrate an embodiment of a removable handle 12 that can be used to facilitate tilting of the hopper 10 in any of the aforementioned embodiments. FIG. 16A provides a side view and FIG. 16B provides a top view of the handle 12 engaging the hopper 10. As shown, the upper circumference, or portion thereof, of the hopper 10 has a curved lip 140. Likewise, the removable handle 12 has a mating receptacle 142 for receipt of the lip 140. The removable handle 12 can be placed in mating engagement with the hopper 10 at any location around its circumference that has the curved lip 140. Consequently, the handle 12 can be used to tilt the hopper 10 in the appropriate direction depending upon the application.

Although described in terms of the embodiments shown in the figures, those skilled in the art who have the benefit of this disclosure will recognize that changes can be made to the individual component parts thereof which do not change the manner in which those components function to achieve their intended result. All such changes are intended to fall within the scope of the following non-limiting claims.

I claim:

1. An adaptable transport, comprising:
   a lawnmower chassis supporting a control frame;
   a support frame providing at least one horizontal support removably affixed to the control frame;
   at least one vertical support having an upper and lower end wherein said upper end is attached to the support frame;
   a pivot foot affixed to the lower end of the vertical support wherein the pivot foot provides a pivotally attached base removably supported on the lawnmower chassis; and
   a hopper adapted to be removably carried by the support frame and tilted in any direction relative to the lawnmower.

2. The adaptable transport of claim 1, wherein the pivot foot is removably attached to the lawnmower by hook and loop fasteners.

3. The adaptable transport of claim 1, wherein the pivot foot comprises a swivel joint.

4. The adaptable transport of claim 1, further comprising one or more detachable handles adapted for tilting the hopper.

5. The adaptable transport of claim 1, wherein the hopper further comprises a sub-frame adapted to fit within the support frame to prevent excess lateral movement of the hopper.

* * * * *